United States Patent
Leone et al.

(10) Patent No.: US 10,018,155 B2
(45) Date of Patent: Jul. 10, 2018

(54) SYSTEM AND METHODS FOR EXTRACTING WATER FROM A MECHANICAL AIR CONDITIONING SYSTEM FOR WATER INJECTION

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 15/272,017

(22) Filed: Sep. 21, 2016

(65) Prior Publication Data

US 2018/0080414 A1    Mar. 22, 2018

(51) Int. Cl.
*F02M 25/022*    (2006.01)
*F02M 25/03*    (2006.01)
(Continued)

(52) U.S. Cl.
CPC ....... *F02M 25/0222* (2013.01); *B60H 1/0045* (2013.01); *B60H 1/3208* (2013.01); (Continued)

(58) Field of Classification Search
CPC .......... F02M 25/0222; F02M 25/0227; F02M 25/03; B60H 1/0045; B60H 1/3208; B60H 1/3233; B60H 2001/3238; B60H 2001/3273
USPC .......... 123/25, 339.17, 339.16, 339.18, 320, 123/406.35, 681, 492, 325, 326, 406.25, 123/406.36, 406.5, 675, 682, 493; 261/18.2, 99; 165/43; 62/61, 133, 134, 62/323.1, 323.4, 285; 296/38
See application file for complete search history.

(56) References Cited

U.S. PATENT DOCUMENTS 6,026,641 A    2/2000 Liberty
6,481,232 B2 *    11/2002 Faqih ................... F24F 13/222
62/285
(Continued)

FOREIGN PATENT DOCUMENTS

EP    2607647 A1    6/2013

OTHER PUBLICATIONS

Leone, Thomas G., et al., "Method and System for Controlling Water Injection," U.S. Appl. No. 15/216,497, filed Jul. 21, 2016, 47 pages.
(Continued)

*Primary Examiner* — Thomas Moulis
*Assistant Examiner* — John Bailey
(74) *Attorney, Agent, or Firm* — Julia Voutyras; McCoy Russell LLP

(57) ABSTRACT

Methods and systems are provided for adjusting an amount of friction brake effort and an air conditioning compressor load to collect water for water injection into an engine. In one example, a method may include adjusting the AC compressor load of a mechanical air conditioning system and an amount of friction brake effort based on a water level in a water storage tank of the water injection system. Further, the method may include adjusting a ratio of the AC compressor load to friction brake effort to deliver a driver demanded brake effort.

20 Claims, 6 Drawing Sheets

(51) Int. Cl.
  *B60H 1/00* (2006.01)
  *B60H 1/32* (2006.01)
(52) U.S. Cl.
  CPC ....... *B60H 1/3233* (2013.01); *F02M 25/0227* (2013.01); *F02M 25/03* (2013.01); *B60H 2001/3238* (2013.01); *B60H 2001/3273* (2013.01)

(56) References Cited

U.S. PATENT DOCUMENTS

| | | | |
|---|---|---|---|
| 6,989,644 | B2 | 1/2006 | Kim |
| 7,552,705 | B2 | 6/2009 | Serkh et al. |
| 9,291,125 | B2 | 3/2016 | Yoshihara et al. |
| 2001/0020529 | A1* | 9/2001 | Karl .................. B60H 1/00007 165/202 |
| 2003/0205930 | A1 | 11/2003 | Smart |
| 2004/0244398 | A1* | 12/2004 | Radermacher ....... B01D 5/0039 62/285 |
| 2009/0277418 | A1* | 11/2009 | Leone .................... F01N 3/005 123/25 R |
| 2010/0121559 | A1 | 5/2010 | Bromberg et al. |
| 2010/0229549 | A1* | 9/2010 | Taylor ................ F02B 29/0468 60/599 |
| 2011/0048039 | A1 | 3/2011 | Kohavi et al. |
| 2011/0174267 | A1 | 7/2011 | Surnilla et al. |
| 2012/0130572 | A1 | 5/2012 | Fedewa |
| 2013/0218438 | A1 | 8/2013 | Surnilla et al. |
| 2013/0291580 | A1* | 11/2013 | Lindner ............... B60H 1/3233 62/288 |
| 2014/0366508 | A1 | 12/2014 | Ulrey et al. |

OTHER PUBLICATIONS

Leone, Thomas G., et al., "Method and System for Controlling Water Injection," U.S. Appl. No. 15/216,525, filed Jul. 21, 2016, 63 pages.
Leone, Thomas G., et al., "Method and System for Controlling Water Injection," U.S. Appl. No. 15/285,311, filed Oct. 4, 2016, 54 pages.
Leone, Thomas G., et al., "System and Methods for Extracting Water from an Electri Air Conditioning System for Water Injection," U.S. Appl. No. 15/271,954, filed Sep. 21, 2016, 51 pages.
Leone, Thomas G., et al., "System and Methods for Extracting Water from a HVAC System for Water Injection," U.S. Appl. No. 15/272,111, filed Sep. 21, 2016, 50 pages.
Bohm, Martin, et al., "Approaches for On-board Water Provision for Water Injection," ATZ Worldwide 2016, vol. 118, pp. 54-57, 4 pages.

* cited by examiner

SYSTEM AND METHODS FOR EXTRACTING WATER FROM A MECHANICAL AIR CONDITIONING SYSTEM FOR WATER INJECTION

FIELD

The present description relates generally to methods and systems for a mechanical air conditioning system and a water injection system of an engine.

BACKGROUND/SUMMARY

Internal combustion engines may include water injection systems that inject water from a storage tank into a plurality of locations, including an intake manifold, upstream of engine cylinders, or directly into engine cylinders. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce NOx, while a more efficient fuel mixture may reduce carbon monoxide and hydrocarbon emissions. As mentioned above, water may be stored in a vehicle to provide water for injection on demand. However, in order to meet the water injection demands of an engine, a vehicle needs to have a sufficient supply of water. In one example, a water storage tank of a water injection may be manually refilled by a vehicle operator. However, in some situations, water for refilling the tank, such as distilled water, may not be readily available and having to re-fill the tank may be undesirable for the operator.

Other approaches to refilling a water storage tank includes collecting water (or condensate) from other vehicle systems on-board the vehicle, such as collecting water from an air conditioning (AC) system. For example, the approach shown by Kohavi and Peretz in US 2011/0048039 includes extracting water from an air conditioning system. Therein, collecting condensate is based on an amount of water stored in a water storage reservoir (e.g. tank). However, the inventors have recognized potential issues with such methods. In particular, collecting water opportunistically from an AC system when the AC system is already operating may be insufficient to meet the water injection demands of an engine. Conversely, running the AC compressor using power supplied by an engine (e.g., a mechanical AC system) independently and/or in addition to operator demand based on a water level in the water storage reservoir may decrease the fuel economy benefit of water injection.

In one example, the issues described above may be addressed by a method for a vehicle including adjusting an AC compressor load of a mechanical AC system and an amount of friction brake effort to deliver a driver demanded braking effort during a braking event based on a level of water in a water reservoir coupled to a water injection system. A water injection system, including the water reservoir, may be fluidly coupled to the mechanical AC system. Thus, when the AC compressor is run (e.g., as the AC compressor load is increased), water may be collected from the mechanical AC system and stored at the water reservoir for use in the water injection system. In this way, the AC compressor may be operated during a braking event to collect water for a water injection system, thereby providing water for injection via the water injection system. For example, adjusting the AC compressor load and the amount of friction braking may include increasing the ratio of the AC compressor load to friction braking during a braking event to collect water from the AC system in response to the water level in the water reservoir (e.g. tank) being less than a threshold level. In this way, the AC compressor may be operated to collect water for the water injection system and a desired brake effort may be delivered. As a result, the water reservoir of the water injection system may be replenished automatically without manual filling. Further, by running the AC compressor to collect water for injection during a braking event, the AC compressor may be operated without added fuel injection at the engine (e.g., kinetic energy from the vehicle may be used to run the compressor). As a result, fuel economy may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
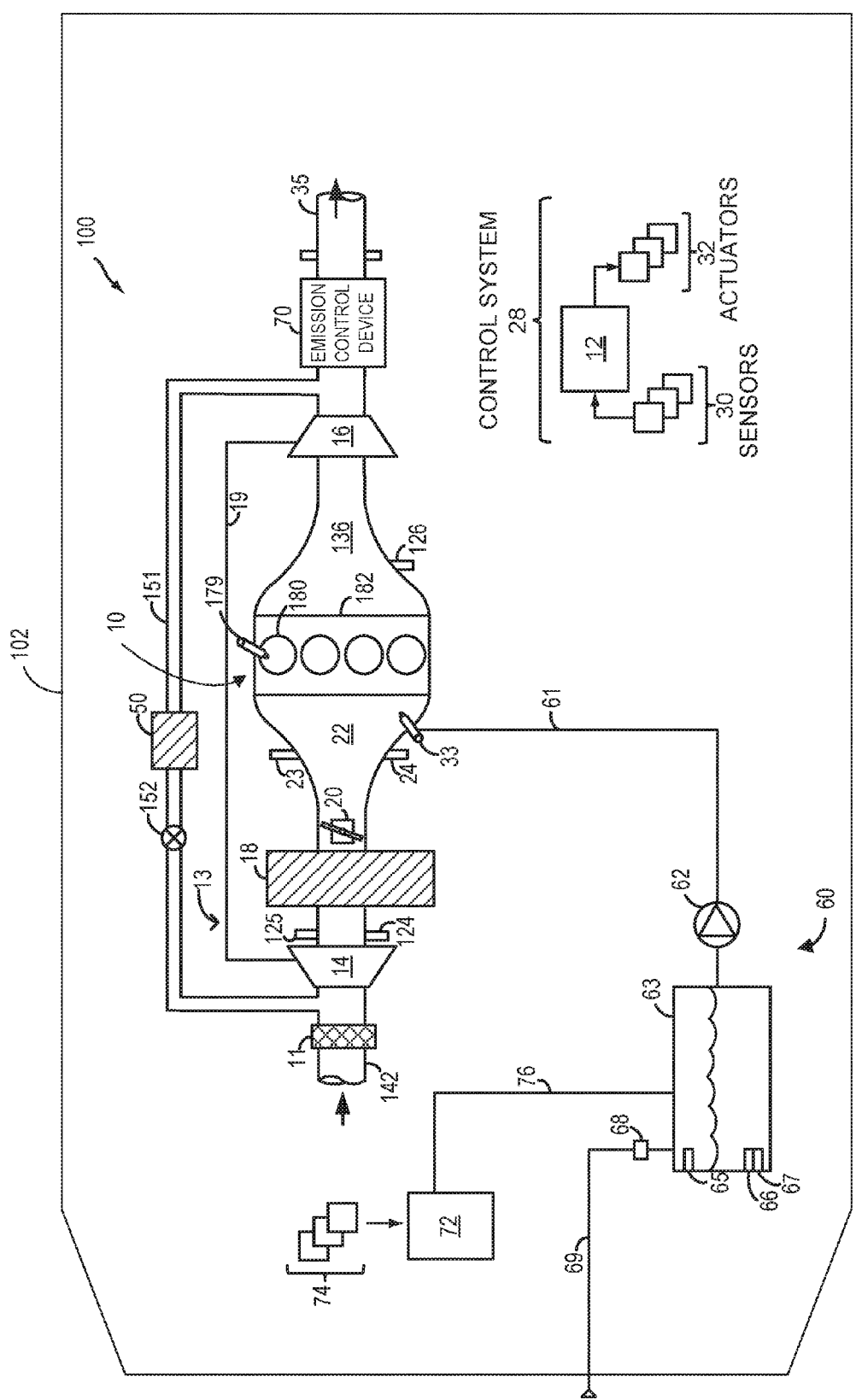
FIG. 1 shows a schematic diagram of an engine system including a water injection system.
Figure 2:
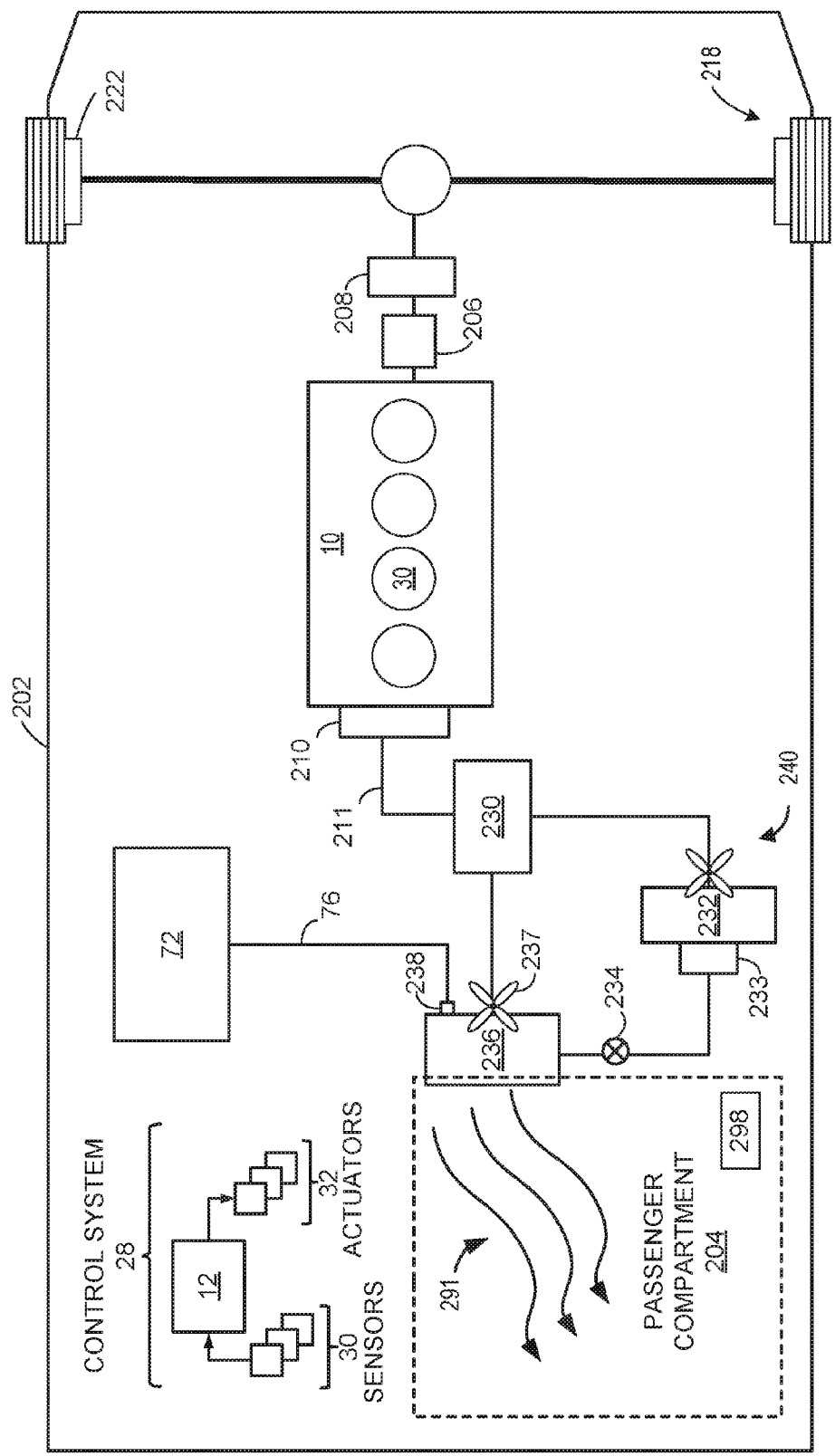
FIG. 2 shows a schematic diagram of a vehicle system including a water injection system, an air conditioning system, and an engine.
Figure 3:
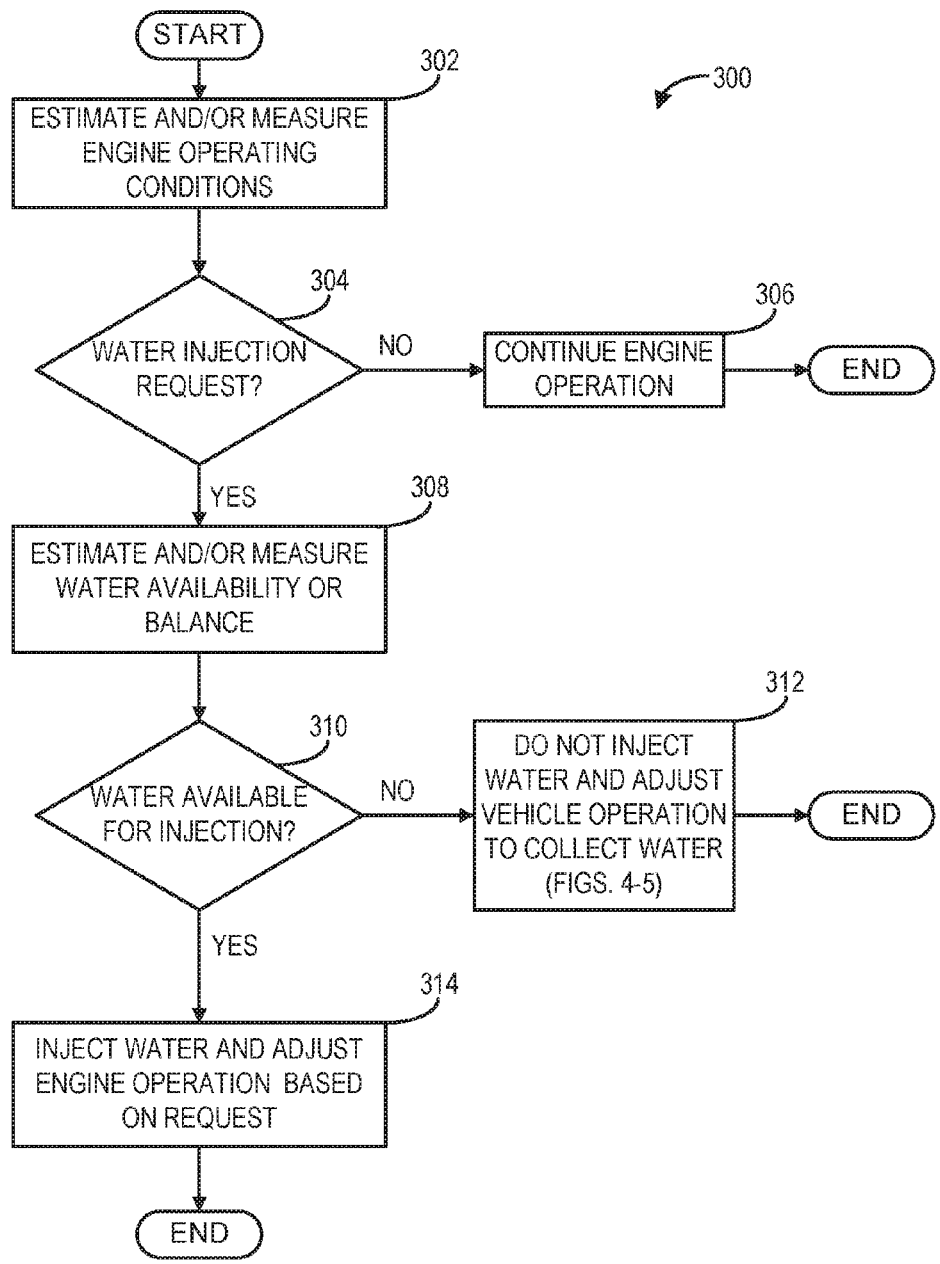
FIG. 3 shows a flow chart of a method for injecting water into an engine based on an injection request.
Figure 4:
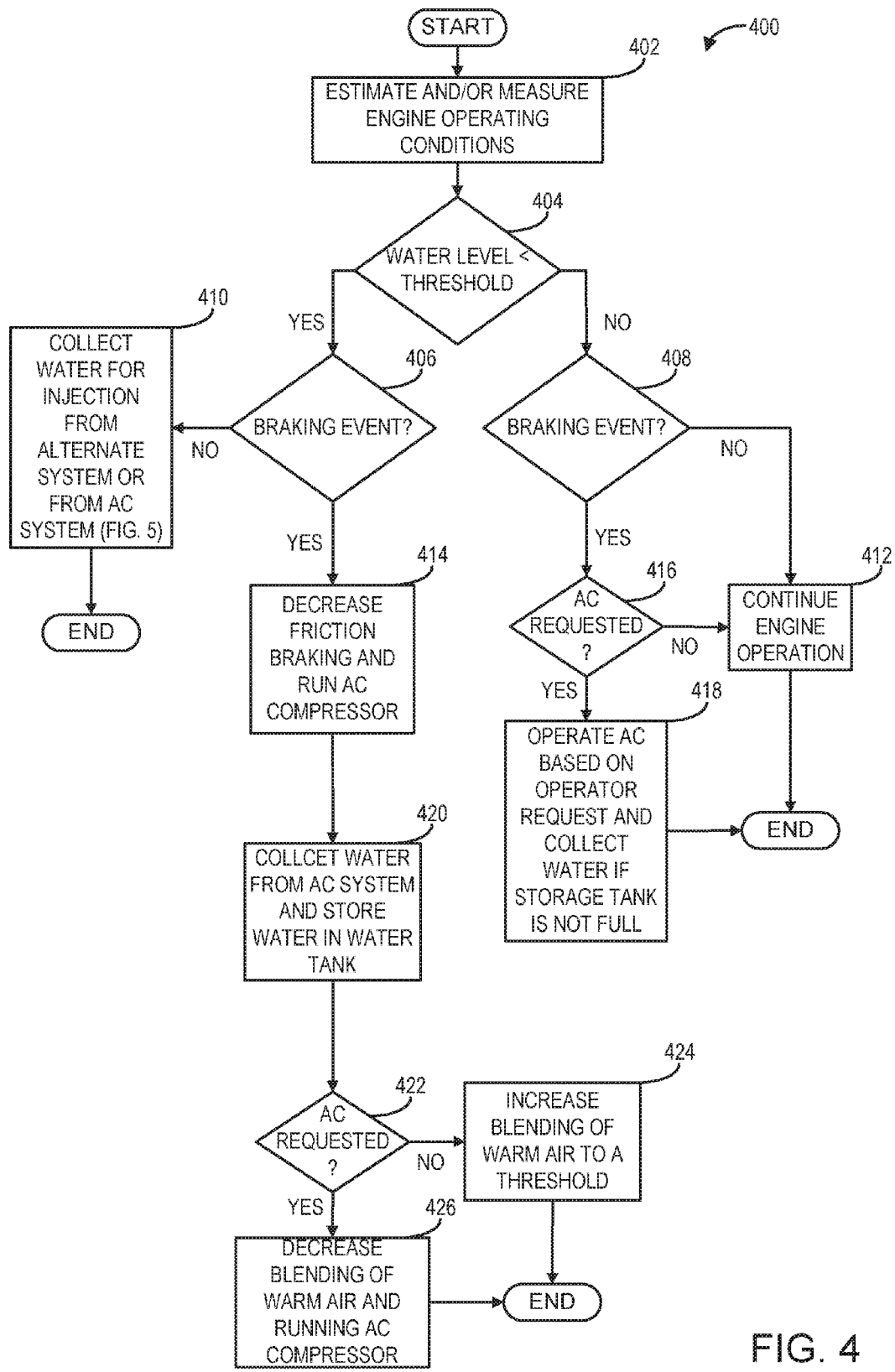
FIG. 4 shows a flow chart of a method for collecting condensate from an air conditioning system and storing extracted condensate for water injection at an engine.
Figure 5:
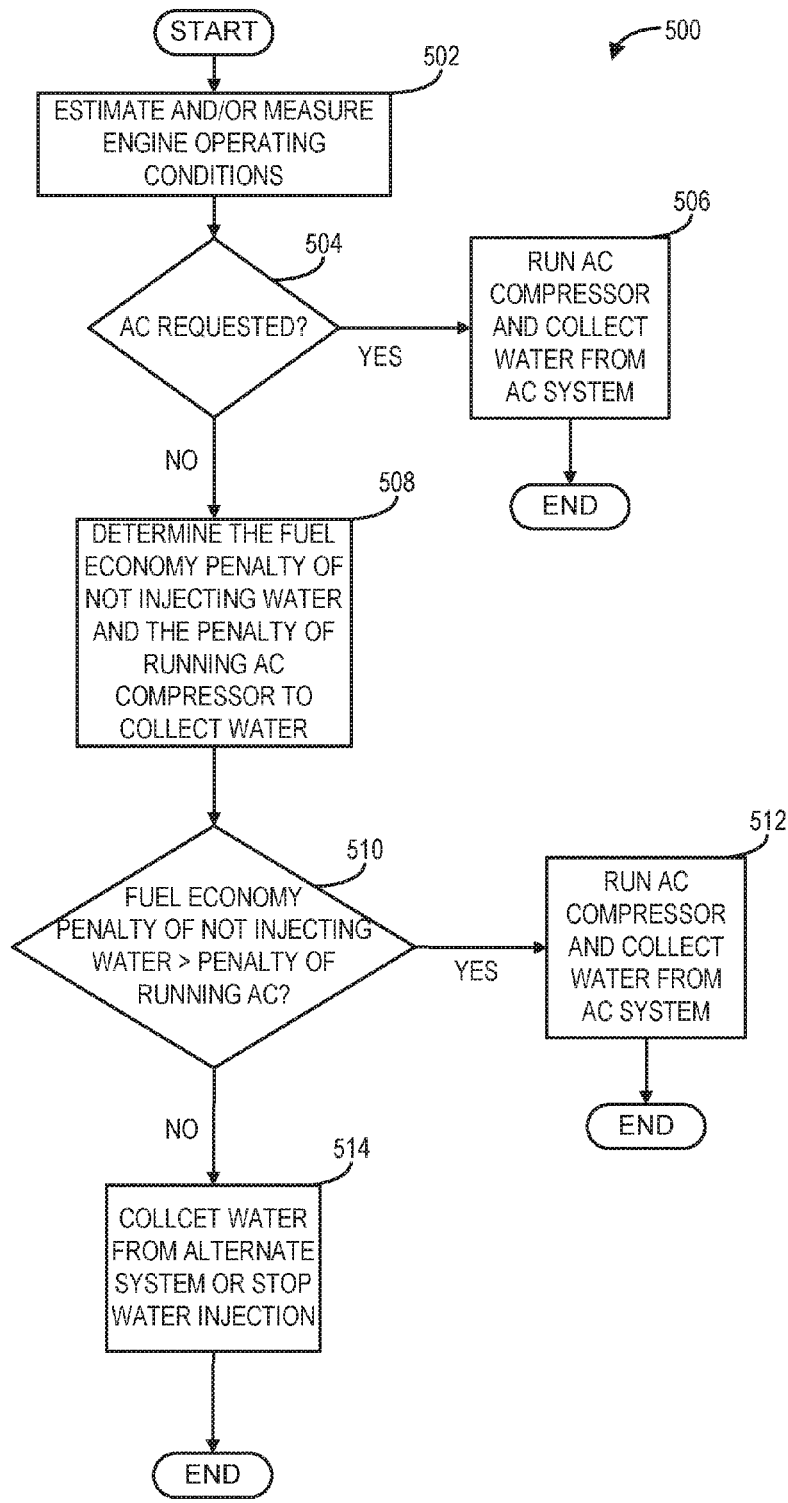
FIG. 5 shows a flow chart of a method for collecting condensate for water injection at an engine if air conditioning has not been requested by a vehicle operator.

The following description relates to systems and methods for adjusting an air conditioning (AC) compressor load and an amount of friction braking based on the water level in a water storage tank of a vehicle system. During a braking event, the amount of friction braking may be decreased and the AC compressor load in a mechanical AC system increased to collect water for injection into an engine and deliver the desired braking effort. Collected water may be stored in the water storage tank of a water collection system and then injected via one or more water injectors coupled with the engine. A schematic depiction of an example engine system, including a water collection system that receives collected condensate from an AC system and injects the collected water into the engine, is shown in FIG. 1. In FIG. 2, a schematic depiction of an example vehicle system is shown, including substantially the same engine system and water injection system as the one shown in FIG. 1. Additionally, FIG. 2 shows coupling amongst friction brakes, the mechanical AC system, the engine, and the water collection system. By adjusting the ratio of friction brake effort to the AC compressor load based on the water level in the water storage tank during a braking event, a desired brake effort may be supplied and water may be collected from the AC system to refill the water storage tank in the water injection system in order to provide water for water injection into the engine. FIGS. 3-5 illustrate example methods for collecting condensate from the AC system by increasing the AC compressor load and decreasing the amount of friction brake effort. Specifically, FIG. 3 shows a method for determining whether to inject water into an engine based on engine operating conditions. FIG. 4 shows a method for collecting water (e.g., condensate or condensed water) by adjusting the amount of friction braking during a braking event and the AC compressor load in response to a water level in the water storage tank. In one example, the amount of friction braking may be decreased and the AC compressor load increased to increase water collection in response to a relatively low water level in the water storage tank. FIG. 5 shows a method for determining a fuel economy penalty of not injecting water or running an AC compressor to collect water if AC has not been requested. For example, the controller may operate the AC compressor to collect water for water injection if the fuel economy penalty of running the AC compressor is less than the fuel economy penalty of not injecting water. Finally, FIG. 6 graphically depicts adjustments to friction braking and the AC compressor load in response to a water storage tank level. For example, during a braking event, the amount of friction braking effort may be decreased and the AC compressor load may be increased in response to the water level in the water storage tank below a threshold. In this way, water condensate collection parameters may be adjusted based on the water level in the water storage tank and water injection demands of the engine. As a result, the water storage tank may be automatically refilled from condensate collected from the AC system for subsequent use in the water injection system. By coordinating operation of the AC compressor and friction brakes, water may be collected for the water injection system and a desired amount of brake effort may be delivered.

Turning to the figures, FIG. 1 shows an embodiment of a water injection system 60 and an engine system 100, in a motor vehicle 102, illustrated schematically. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers or cylinders 180 through a series of intake valves (not shown). As shown in FIG. 1, the intake manifold 22 is arranged upstream of all combustion chambers 180 of engine 10. Sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 142. The MCT sensor 23 may be positioned between the throttle 20 and the intake valves of the combustion chambers 180. The ACT sensor 125 may be located upstream of the CAC 18 as shown, however, in alternate embodiments, the ACT sensor 125 may be positioned upstream of compressor 14. The air temperature may be further used in conjunction with an engine coolant temperature to compute the amount of fuel that is delivered to the engine, for example.

The combustion chambers are further coupled to exhaust manifold 136 via a series of exhaust valves (not shown). In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. In one example, emission control device 70 may include a three-way catalyst (TWC).

All or part of the treated exhaust from emission control device 70 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped (e.g. taken) from downstream of turbine 16. The EGR valve 152 may be opened to admit a controlled amount of cooled exhaust gas to the compressor inlet for desirable combustion and emissions-control performance. In this way, engine system 100 is adapted to provide external, low-pressure (LP) EGR. In other embodiments, the EGR system may be a high pressure EGR system with EGR passage 151 connecting from upstream of the turbine 16 to downstream of the compressor 14. In some embodiments, the MCT sensor 23 may be positioned to determine the manifold charge temperature, and may include air and exhaust recirculated through the EGR passage 151.

The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Furthermore, combustion chamber 180 draws in water and/or water vapor, which may be injected into the engine intake by water injector 33. As shown in FIG. 1, the water injector 33 is positioned in the intake manifold 22, downstream of the throttle 20 and upstream of all the combustion chambers (e.g., cylinders) 180 of the engine 10. In another embodiment, water injector 33 may be positioned downstream of the throttle 20, in one or more intake runners (e.g., ports; not shown) leading to one of the combustion chambers 180, or in one or more combustion chambers 180 to inject water directly. In yet another embodiment, the water injection system water may include a plurality of water injectors positioned in one or more of these locations. For example, an engine may include each of a water injector positioned in an intake manifold 22, water injectors positioned at each intake runner, and water injectors positioned at each combustion chamber, in one embodiment. Water may be delivered to water injector 33 by the water injection system 60.

The water injection system 60 includes a water storage tank (or reservoir) 63, a water pump 62, and a water filling passage (e.g., manual water filling passage) 69. Additionally, water injection system 60 is coupled to water collection system 172, which extracts water (e.g., in the form of liquid condensate) from an air conditioning system, as described further below. Water stored in water storage tank 63 is delivered to water injector 33 via water passage 61. In another embodiment, water stored in water storage tank 63 may be delivered to multiple water injectors coupled to the intake, as previously described. In embodiments that include multiple injectors, water passage 61 may include one or more valves and water passages (not shown) to select between different water injectors or one or more water pumps each coupled to a water injector passage for one or more injectors. Water pump 62 may be operated by a controller 12 to provide water to water injector 33 via passage 61.

Water storage tank 63 may include a water level sensor 65, a water quality sensor 66, and a water temperature sensor 67, which may relay information to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The water quality sensor 66 may detect whether the water in water storage tank 63 is suitable for injection. As one example, water quality sensor 66 may be a conductivity sensor. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. In another example, the level of water in water tank 63 may be used to determine whether sufficient water for injection is available, as described below with reference to FIG. 3. In the depicted embodiment, water storage tank 63 may be manually refilled via water filling passage 69 and/or refilled automatically by the collection system 72 via water tank filling passage 76. Collection system 72 may be coupled to one or more components 74 that refill the water storage tank with condensate collected from various engine or vehicle systems. In one example, collection system 72 may be coupled with an EGR system to collect water condensed from exhaust passing through the EGR system. In another example, collection system 72 may be coupled with an air conditioning system (as shown in FIG. 2). Manual filling passage 69 may be fluidically coupled to a filter 68, which may remove small impurities contained in the water that could potentially damage engine components.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, accelerator pedal input (e.g., pedal position), brake pedal input, transmission selector position, vehicle speed, engine speed, mass airflow through the engine, boost pressure, ambient temperature, ambient humidity, intake air temperature, fan speed, etc.), cooling system sensors (such as ECT sensor, fan speed, passenger compartment temperature, ambient humidity, etc.), CAC 18 sensors (such as CAC inlet air temperature, ACT sensor 125 and pressure, CAC outlet air temperature, MCT sensor 23, and pressure, etc.), knock sensors 183 for determining ignition of end gases and/or water distribution among cylinders, water injection system sensors (such as water level sensor 65, water quality sensor 66, and water temperature sensor 67), and others. Furthermore, controller 12 may communicate with various actuators 32, which may include engine actuators (such as fuel injectors, an electronically controlled intake air throttle plate, spark plugs, water injectors, water pumps, etc.). In some examples, the storage medium (e.g., memory) may be programmed with computer readable data representing instructions executable by the processor for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, injecting water to the engine may include adjusting an actuator of injector 33 to inject water and adjusting water injection may include adjusting an amount or timing of water injected via the injector. In another example, collecting condensate for a water injection system 60 may include adjusting the operation of water collection system 72, such as an air conditioning system.

FIG. 2 shows an example embodiment of an air conditioning system 240 coupled to an engine 10 and friction brakes 222 in a vehicle 202, illustrated schematically. The vehicle 202 shown in FIG. 2 may have similar elements to vehicle 102 shown in FIG. 1, such as engine 10 shown in FIG. 1. As such, similar components in FIG. 2 to those of FIG. 1 are labelled similarly and are not re-described below for the sake of brevity.

Vehicle system 202 includes an internal combustion engine 10, an air conditioning system 240, and a water collection system 72. Further, vehicle system 202 may include final drive/wheels 218, which may contact a road surface. Additionally, wheels 218 may include brakes (e.g., friction brakes) 222 to provide the vehicle system 202 with friction braking. For example, brakes 222 may include a brake unit that may adjust the brake effort in response to an operator requested braking amount based on a brake pedal position. The amount of braking effort may include brake force and/or brake torque. Engine 10 may be coupled to torque converter 206 via a crankshaft. Torque converter 206 is also coupled to transmission 208 via a turbine shaft. Transmission 208 comprises an electronically controlled transmission with a plurality of selectable discrete gear ratios and various other gears, such as a final drive ration (not shown). Transmission 208 is also coupled to wheels 218 via an axle. Vehicle system 202 may utilize a variety of different operational modes depending on operating conditions encountered to propel or decelerate (e.g. braking in response to an operator request via depressing a brake pedal of the vehicle, in one example) the vehicle.

Air conditioning system 240 includes a compressor 230, a condenser 232, and an evaporator 236 for providing cooled air to the vehicle passenger compartment 204. Compressor 230 receives refrigerant gas from evaporator 236 and pressurizes the refrigerant. Compressor 230 may include a clutch 210, which may be selectively engaged and disengaged, or partially engaged, to supply compressor 230 with rotational energy from engine 10, via a drive pulley/belt 211. In this way, compressor 230 is mechanically driven by engine 10 through a clutch 210 driven by belt 211. The controller may adjust a load of compressor 230 by actuating clutch 210 through a clutch relay or other electric switching device. In one example, the controller may increase the load of compressor 230 in response to a request for air conditioning. In another example, the controller may increase the load of compressor 230 and decrease an amount of friction braking by brakes 222 such that a desired amount of braking is delivered. For example, when increasing the load of the compressor 230, the controller may decrease the amount of friction braking by a proportional amount in order to deliver the desired (e.g., demanded) amount of braking. In yet another example, compressor 230 may be a variable displacement AC compressor and may include a variable displacement control valve. After compressor 230 receives and pressurizes the refrigerant gas, heat is extracted from the pressurized refrigerant so that the refrigerant is liquefied at condenser 232. A drier 233 may be coupled to condenser 232 to reduce undesired moisture (e.g. water) from the air conditioning system 240. In some embodiments, drier 233 may include a filter (not shown) to remove particulates. After being pumped into condenser 232, refrigerant is supplied to evaporator 236 via evaporator valve 234. The liquefied refrigerant expands after passing through evaporator valve 234 causing the temperature of evaporator 236 to be reduced. In this way, air temperature may be reduced by passing the air over evaporator 236 via fan 237. Evaporator 236 is further fluidically coupled to water collection system 72, which is substantially similar to water collection system 72 shown in FIG. 1, to extract water from the air conditioning system 240 for water injection into engine 10. Condensate forms at evaporator 236 as air is cooled and the condensate is then delivered to the water collection system 72 via a condensate drain 238 and water tank filling passage 76.

Then, cooled air from evaporator 236 may be directed to passenger compartment 204 through ventilation duct 291, illustrated by arrows. Controller 12 operates fan 237 according to operator settings, which may be inputted using vehicle instrument panel 298, as well as climate sensors. Within the passenger compartment (e.g. cabin), a vehicle operator or passenger may input desired air conditioning parameters via a vehicle instrument panel 298. In one example, the vehicle instrument panel 298 may comprise one or more of input portions for receiving an operator input, such as buttons, touch screens, voice input/recognition, etc. In the depicted example, vehicle instrument panel 298 may include input portions for receiving operator input for the air conditioning system 240 (e.g. on/off state of the air conditioning system, desired passenger compartment temperature, fan speed, and distribution path for conditioned cabin air). Further, the vehicle instrument panel 298 may include one or more of indicator lights and/or a text-based display with which messages are displayed to an operator. In another example, a plurality of sensors 30 may include one or more climate sensors, which may indicate the temperature of evaporator 236 and passenger compartment 204, as well as ambient temperature, to controller 12. Further, sensors 30 may include humidity sensors to measure the humidity of passenger compartment 204, as well as the humidity of air passed through air conditioning system 240.

FIG. 2 further shows a control system 28. Control system 28 is substantially similar to control system 28 shown in FIG. 1, including controller 12, which may receive input from a plurality of sensors 30 and may communicate with various actuators 32. The controller 12 receives signals from the various sensors of FIG. 2 and employs the various actuators of FIG. 2 to adjust engine operation based on the received signals and instructions stored on a memory of the controller. For example, collecting water from an air conditioning system may include adjusting an amount of friction braking applied via brakes 222, and an air conditioning compressor load of compressor 230. The controller may receive signals from sensors, such as signals about an amount of brake pedal depression or a water level in a water storage tank and may employ actuators of the friction brakes to adjust the amount of friction braking and actuators of the compressor 230 to adjust the air conditioning compressor load. In one example, the controller may determine the desired braking level based on an amount of brake pedal depression. Then, the controller may decrease the amount of friction braking and increase the air conditioning compressor load in response to a signal from a water level sensor of a water storage tank, such as water level sensor 65 shown in FIG. 1. In this way, by decreasing the amount of friction braking and increasing the load of compressor 203, the controller may deliver the desired amount of braking and increase the amount of condensate at condenser 232, thereby increasing an amount of water available for collection from the AC system 240.

In this way, the systems of FIGS. 1 and 2 present example systems that may be used to extract water (e.g., condensate) from a mechanical air conditioning system and store collected water for injection at the engine from a water injection system. Use of a water injection system may be limited by the amount of water stored in a water storage tank. Thus, by coupling an air conditioning system to a water collection system to collect water at a condenser of an air conditioning system, as shown in FIGS. 1 and 2, a water collection system may supply water for the water injection system. Collecting water for a water collection system may be adjusted in response to one or more of a water storage level, water injection demands, and various engine operating parameters, as shown in the methods presented at FIGS. 3-5. For example, the air conditioner compressor load and amount of friction braking torque during braking may be adjusted to collect water for the water collection system in response to one or more of a water level in a water storage tank, as shown in the methods presented at FIGS. 4 and 5.

Turning to FIG. 3, an example method 300 for injecting water into an engine is depicted. Instructions for carrying out method 300 and the rest of the methods included herein may be executed by a controller (such as controller 12 shown in FIGS. 1-2) based on instructions stored on a memory of the controller and in conjunction with signals received from sensors of the engine system, such as the sensors described above with reference to FIG. 1. The controller may employ engine actuators of the engine system to adjust engine operation, according to the methods described below. In one example, water may be injected via one or more water injectors using water stored in a water storage tank of a water injection system (such as water storage tank 63 of water injection system 60 shown in FIG. 1).

The method 300 begins at 302 by estimating and/or measuring engine operating conditions. Engine operating conditions may include manifold pressure (MAP), air-fuel ratio (A/F), spark timing, fuel injection amount or timing, an exhaust gas recirculation (EGR) rate, mass air flow (MAF), manifold charge temperature (MCT), engine speed and/or load, an engine knock level, etc. Next, at 304, the method includes determining whether water injection has been requested. In one example, water injection may be requested in response to a manifold temperature being greater than a threshold level. Additionally, water injection may be requested when a threshold engine speed or load is reached. In yet another example, water injection may be requested based on an engine knock level being above a threshold. Further, water injection may be requested in response to an exhaust gas temperature above a threshold temperature, where the threshold temperature is a temperature above which degradation of engine components downstream of cylinders may occur. In addition, water may be injected when the inferred octane number of used fuel is below a threshold.

If water injection has not been requested, engine operation continues at 306 without injecting water. Alternatively, if water injection has been requested the method continues at 308 to estimate and/or measure water availability for injection. Water availability for injection may be determined based on the output of a plurality of sensors, such as a water level sensor and/or a water temperature sensor disposed in the water storage tank of the water injection system of the engine (such as water level sensor 65 and water temperature sensor 67 shown in FIG. 1). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles. In response to the water level of the water storage tank being below the threshold level, refilling of the tank may be indicated. At 310, the method includes determining whether water is available for injection. If water is not available for injection, the method continues at 312 to adjust vehicle operating parameters to collect water. This may include collecting water from vehicle systems, such as a mechanical air conditioning system as described below with regard to FIGS. 4 and 5. The method at 312 may further include storing the collected water at the water storage tank. In one embodiment, additionally, the controller may send a notification to a vehicle operator to manually refill the tank. However, if water is available for injection, the method continues at 314 to inject water (stored in the water storage tank) based on the water injection request. Injecting water may include actuating, via a controller, an actuator of one or more water injectors (such as water injector 33 shown in FIG. 1) of the engine to inject water stored in the water storage tank into an intake manifold (or other location in the intake of the engine and/or in engine cylinders of the engine). Injecting water may include injecting a requested amount of water over a duration or as one or more pulses.

FIG. 4 shows an example method 400 for extracting water (e.g., in the form of condensate) from a mechanical air conditioning system of a vehicle. As described above, water for a water injection system may be collected from an on-board system, such as an air conditioning system (e.g., air condition system 240 shown in FIG. 2). Extracting condensate from the air conditioning system, such as air conditioning system 240 shown in FIG. 2, may include extracting water using a water collection system, such as the water collection system 72 shown in FIGS. 1 and 2.

The method 400 begins at 402 by estimating and/or measuring engine operating conditions. Engine operating conditions may include manifold pressure (MAP), air-fuel ratio (A/F), spark timing, fuel injection amount or timing, water injection amount or timing, water level in a water storage tank, braking amount, engine speed and/or load, etc. The water level in the water storage tank may be determined based on output from a sensor, such as a water tank level sensor disposed in a water storage tank of a water injection system of the engine (such as water level sensor 65 shown in FIG. 1). For example, the water level of the water storage tank may be measured via a sensor coupled inside the tank. Next, at 404, the method includes determining whether the water level in the water storage tank is below a threshold level. In one example, the threshold level is based on an amount of water required (e.g., requested) for a requested injection event or a period of injection cycles. In another example, the threshold level of water in the water storage tank may be a set level that is greater than zero but less than a full water tank level.

If the water level is below the threshold level, the method continues at 406 to determine whether a braking event is occurring. A braking event may be occurring if the controller receives a signal from a vehicle operator requesting braking of the vehicle (e.g., a signal generated from depression of a brake pedal of the vehicle). For example, the braking event may be initiated by the vehicle operator depressing the brake pedal of the vehicle. In response to the controller receiving the signal generated from depression of the brake pedal, the controller determines an amount of brake effort and then sends a signal to an actuator of the friction brakes (such as friction brakes 222 shown in FIG. 2) to adjust the braking effort. If a braking event is not occurring, then at 410 the method includes collecting water for injection from an alternate system or from the AC system, according to the method 500 described further below with regard to FIG. 5. The method at 410 may include extracting condensate from another water collection system of the vehicle, such as an exhaust gas recirculation system, in one example. Additionally or alternatively, the method at 410 may include indicating a refill request for the water storage tank. In one example, the controller may send a notification (e.g., a visual indication or audible signal) to the vehicle operator to manually refill the water storage tank. In another example, the method at 410 may include extracting condensate from the AC system, as described further below with regard to FIG. 5.

Alternatively at 406, if braking is occurring, the method continues at 414 to decrease friction braking and run the AC compressor. For example, running the AC compressor of the mechanical AC system may include using kinetic energy of the vehicle during a braking event to power the compressor. During a braking event, kinetic energy of the vehicle is transferred via the transmission to the engine crankshaft, where the A/C compressor applies a load that absorbs rotational energy from the engine crankshaft, thereby using energy from a crank of the engine to slow the vehicle and power the AC compressor. In one example, the method at 414 includes decreasing the amount of brake torque being applied via the friction brakes and increasing the load of the AC compressor. By increasing the AC compressor load, the controller may require less braking torque from the friction brakes to deliver a desired amount of braking. As described previously, the desired amount of braking during a braking event may be determined by a level of depression of a brake pedal. Further, the desired compressor load may be determined by the controller, according to logic rules that are a function of the level of water in the water storage tank. The controller may then determine the amount of decreasing the braking torque of the friction brakes based on the desired compressor load (e.g., the amount of decreasing the compressor load). At 414, the controller may also determine a control signal to send to actuators of the friction brakes based on the determined amount of decreasing the braking torque of the friction brakes. Additionally, as one example, adjusting the AC compressor load at 414 includes increasing the average load of the AC compressor by increasing the amount of time a AC compressor clutch is engaged relative to the amount of time the clutch is disengaged. Further, at 414, the amounts by which friction braking is decreased and the AC compressor load is increased increases as the level of water in the water storage tank decreases.

At 420, the method includes collecting water from the air conditioning system and storing the water in the water storage tank. For example, collecting water from the AC system includes collecting condensate that forms at an evaporator of an AC system (such as evaporator 236 shown in FIG. 2) as air is passed over the evaporator to cool the air and then directing the collected condensate (e.g., via a water passage) to the water storage tank. Then, at 422, the method includes determining whether air conditioning was requested. In one example, air conditioning may be requested by a vehicle operator using a control panel in a passenger compartment of a vehicle (such as control panel 298 shown in FIG. 2). For example, the controller may receive a signal from the control panel requesting that the AC system be turned on and operated at a set temperature level. If AC has been requested at 422, then at 426 the method includes decreasing the blending of warm air while running the AC compressor. For example, if AC has been requested, the controller may run the AC compressor for water collection and to cool the passenger compartment. However, in one example, a desired passenger compartment temperature, based on a signal received by the controller from the control panel, may be higher relative to the temperature of cooled air passing over the evaporator. In response to the desired passenger compartment temperature being warmer than the AC system air, the controller may blend an amount of warm air (e.g., such as ambient air or air from under a hood of the vehicle) with the cooled air of the AC system and then direct the blended air to the passenger compartment, where the amount of warm air is based on an amount needed to reach a set temperature level. In one example, the controller may decrease the amount of warm air blending as the difference between the set passenger compartment temperature and the AC air temperature decreases. In this way, the controller may run the AC compressor to collect water while still providing air of the desired temperature to the passenger compartment of the vehicle. If AC has not been requested at 422, the method continues at 424 and includes increasing the blending of warm air to a threshold. The threshold amount of warm air blending may be based on input signals from a vehicle operator regarding a desired passenger compartment temperature and output of a plurality of sensors, such as sensors for ambient temperature and passenger compartment temperature. For example, the controller may receive signals from an AC temperature sensor, a passenger compartment temperature sensor, and an ambient air temperature sensor. In one example, if AC has not been requested, the controller may increase the amount of warm air blending as the difference between the passenger compartment temperature and the AC air temperature increases. Additionally, or alternatively, the controller may vent the cooled air from the AC and not direct the cooled air to the passenger compartment.

If, at 404, the water level in the water storage tank is not below the threshold level, the method continues at 408 to determine whether a braking event is occurring. If braking is not occurring, then the method includes continuing engine operation at 412. For example, the current engine operation may be maintained without adjusting operating of the AC system different than requested by the vehicle operator (e.g., according to user-set temperature settings of the vehicle climate control or AC system). Additionally, if the AC system is running during engine operation when braking is not occurring, water may still be collected for the water injection system if the water storage tank is able to store water. For example, the controller may send a control signal to a water collection system actuator when the AC system is running to collect water based on the water level in the water storage tank. In this way, water may opportunistically be collected from the AC system during AC system operation if the water storage tank can store water.

However, if there is a braking event at 408, the method continues at 416 where the method includes determining whether AC has been requested, as described above with reference to the method at 422. If AC has not been requested, the method continues to 418 where the method includes operating the AC system based on operator request and collecting water if the storage tank is not full. For example, the controller may determine the operational load of the AC compressor based on the operator input (e.g. a set temperature for the AC system and a current passenger compartment temperature) and not based on the water level in the water storage tank. Specifically, the controller may make a logical determination of the desired AC compressor load based on logic rules that are a function of the operator input (e.g., temperature request or on/off state of the AC system) and not the water level. Then, the controller may send a signal based on the logical determination to an actuator of the AC compressor to run the AC compressor based on the determined operational load. Further, if the water storage tank is not full (e.g., the tank can store water), the method at 418 includes collecting water from the AC system and storing water in the water storage tank. In this way, method 400 shows a method for collecting condensate from an mechanical AC system. As the AC compressor load increases (e.g., as the AC compressor is run at a higher level and more power is directed to the AC compressor), more condensate may be extracted from the AC system for use in the water injection system. During a braking event, the AC compressor load may be increased by a first amount and friction braking may be decreased by a second, proportional or equivalent amount such that the amount of demanded brake effort is delivered. Additionally, by running the AC compressor during a braking event, more water may be collected at the water storage tank.

FIG. 5 shows an example method 500 for determining whether to collect water for water injection from a mechanical AC system or an alternate system. The method 500 continues from the method at 410 of FIG. 4 in response to determining that the water level in the water storage tank is below the threshold water level and a braking event is not occurring.

The method 500 begins at 502 by estimating and/or measuring engine operating conditions. Engine operating conditions may include manifold pressure (MAP), air-fuel ratio (A/F), spark timing, fuel injection amount or timing, water injection amount or timing, water level in a water storage tank, AC compressor load, engine speed and/or load, etc. The water level in the water storage tank may be determined based on output from a sensor, such as a water tank level sensor disposed in a water storage tank of a water injection system of the engine (such as water level sensor 65 shown in FIG. 1). For example, the water level of the water storage tank may be measured via a sensor coupled inside the tank.

Next, at 504, the method includes determining whether air conditioning was requested. In one example, air conditioning may be requested by a vehicle operator using a control panel in a passenger compartment of a vehicle (such as control panel 298 shown in FIG. 2). For example, the controller may receive a signal from the control panel requesting that the AC system be turned on and operated at a set temperature level. If AC has been requested at 504, then at 506 the method includes running the AC compressor and collecting water from the AC system. For example, if AC has been requested, the controller may run the AC compressor according to user demand (e.g., based on a user request and/or user-defined temperature settings for the passenger compartment) to cool the passenger compartment to the desired level, while at the same time collecting condensate from the AC system. In this way, water may be opportunistically collected from the AC system when AC has been requested if a braking event is not occurring. As a result, more water for water injection into an engine may be collected. However, if AC has not been requested at 504, the method continues at 508 to determine the fuel economy penalty of not injecting water and the fuel economy penalty of running the AC compressor to collect water. For example, as engine speed/load increases, the fuel economy penalty of not injecting water may increase relative to the fuel economy penalty of running the AC compressor to collect water (e.g., even if AC has not been requested by the user).

Next, at 510, the method includes determining whether the fuel economy penalty of not injecting water is greater than the fuel economy penalty of running the AC compressor. If the fuel economy penalty of not injecting water at 510 is greater than the fuel economy penalty of running the AC compressor, the method continues at 512 to run the AC compressor and collect water from the AC system. In this way, water for water injection may be collected from the AC system if the fuel economy penalty of running the AC compressor is less than the fuel economy penalty of not injecting water. As a result, engine efficiency may be increased. However, if the fuel economy penalty of not injecting water is not greater than the fuel economy penalty of running the AC compressor, the method at 514 includes collecting water from an alternate system or stopping water injection. In one example, the method at 514 may including collecting water from another water collection system, such as an EGR system. In another example, the method at 514 may include stopping water injection and adjusting engine operation. In this way, water for water injection may be collected from another system or water collection may be stopped if the fuel economy penalty of running the AC compressor is greater than the penalty of not injecting water. As a result, fuel efficiency may be increased.

Figure 6:
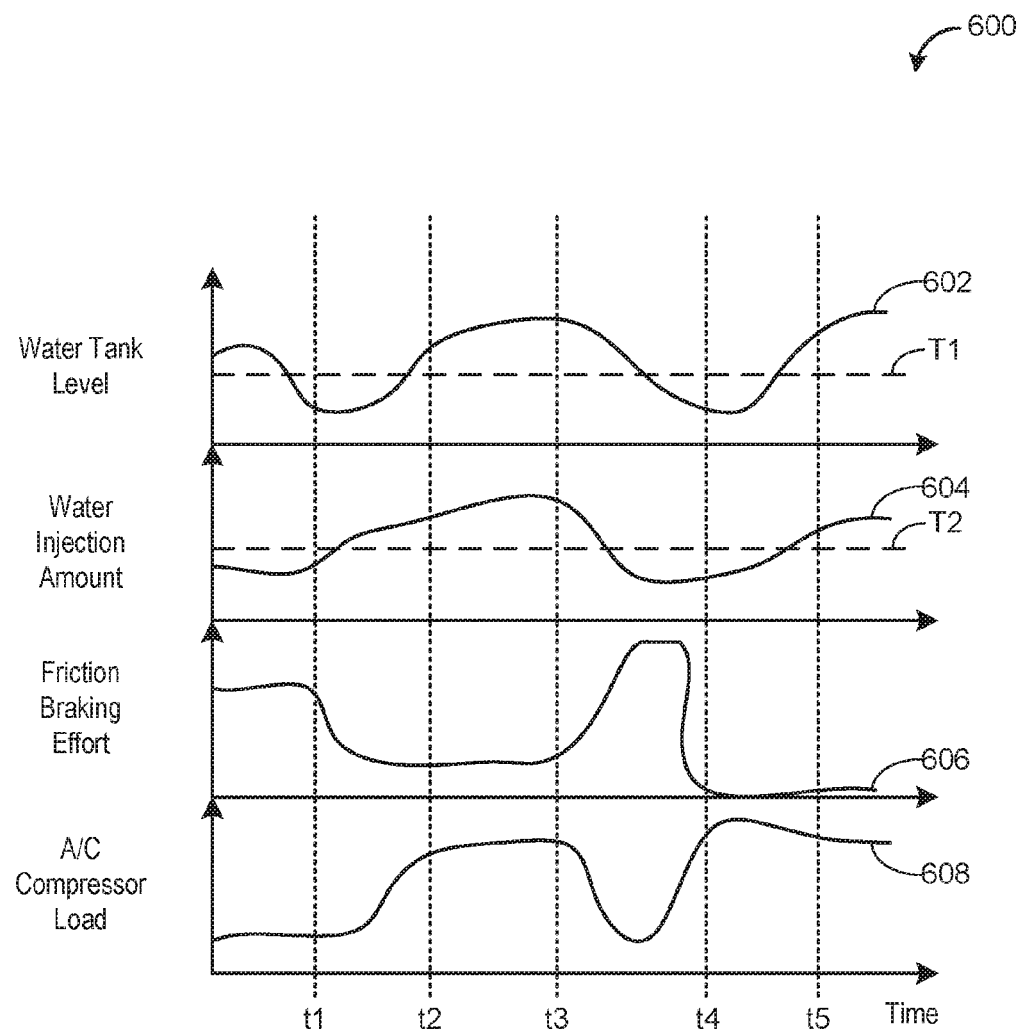
FIG. 6 shows a graph depicting adjustments to friction braking and an air conditioning compressor load in response to a water storage tank level and desired water injection amount.

Finally, FIG. 6 shows a graph 600 depicting adjustments to an amount of friction braking effort and an AC compressor load in response to a water level in a water storage tank and various engine operating conditions. The water storage tank may be a water storage tank of a water injection and water collection system, as described above. The AC compressor may be part of a mechanical AC system, such as the AC system described above. Further, water for water injection may be collected from the AC system, as the AC compressor is run, and stored at the water storage tank. The operating parameters illustrated in the graph 600 include water tank level at plot 602, water injection amount (injected via one or more water injectors of the water injection system) at plot 604, the amount of friction braking effort at plot 606, and an AC compressor load of the AC compressor at plot 608. Thresholds for various operating parameters (such as water level and water injection amount) are depicted as a dashed horizontal line. For each operating parameter, time is depicted along the horizontal axis and values of each respective operating parameter are depicted along the vertical axis.

Prior to time t1, the water level (plot 602) in the water storage tank of the water injection system decreases such that, at time t1, the water level is below a threshold T1. The water level in the water storage tank may be indicated by a water level sensor (such as water level sensor 65 shown in FIG. 1). Additionally at time t1, a braking event is occurring. In response to the water level in the water storage tank being less than the threshold T1 while braking is occurring, the controller decreases the amount of friction braking (plot 606) and runs the AC compressor to collect water for the water injection system at time t1. For example, the controller increases the AC compressor load to collect water from the AC system (e.g., even if the operator has not requested AC or the temperature of the vehicle cabin is cooler than a temperature demanded via the operator). The amount of decreasing the friction braking may be based on the amount of increasing the AC compressor load. As a result of decreasing the amount of friction braking and running the AC compressor to collect water, the water level in the water storage tank (plot 602) increases above the threshold T1 by time t2 while also delivering the driver demanded braking effort.

At time t3, braking is occurring. In response to the water level in the water storage tank (plot 602) being above the threshold T1, the controller increases the amount of friction braking effort at time t3. Additionally, the controller decreases the AC compressor load (plot 610) in response to AC not being requested by a vehicle operator. In another example, the controller may operate the AC compressor in response to a request for air conditioning in a vehicle passenger compartment. Further, the water injection amount (plot 604) increases from time t1 to time t3. Subsequently, the water level in the water storage tank decreases between time t3 and time t4.

At time t4, the water level in the water storage tank is below the threshold T1 and braking is not occurring. Additionally, the AC compressor is running. In one example, the AC compressor may be running in response to a request for air conditioning in a vehicle passenger compartment. In response to the water level below the threshold T1 (plot 602) and the AC compressor running, the controller runs the AC compressor to collect water opportunistically. In another example, the controller may collect water from the AC system when the AC compressor is running and the water level in the water storage tank is not below the threshold T1 and is also not above an upper threshold (e.g., when water storage tank is able to store more water). In yet another example, if the AC compressor is not running (e.g., the operator has not requested AC or the temperature of the vehicle cabin is cooler than a temperature demanded via the operator), the controller may collect water from another vehicle system or operate the AC compressor to collect water based on a determination of the fuel economy penalty of running the AC or stopping water injection at the engine. At time t5, as a result of decreasing the amount of friction braking and increasing the AC compressor loading, the water level in the water storage tank increases.

In this way, the ratio of friction braking effort to an air conditioning compressor load may be adjusted to collect water from a mechanical air conditioning system for a water injection system based on a water level in a water storage tank. For example, during a braking event, the amount of friction brake effort may be decreased and the AC compressor operated in response to the water level being below a threshold. By adjusting the amount of friction braking and operating the AC compressor, water may be collected for water injection and a desired amount of brake effort delivered. As a result, water for water injection may be collected as needed during a braking event without using additional fuel to run the AC compressor (e.g., kinetic energy from the vehicle may be used to power the AC compressor to generate and collect water at the water storage tank). By coordinating braking demands with AC compressor operation and collecting water for the water injection system, fuel economy may be increased and the likelihood of running out of water for water injection may be reduced. Additionally, collecting water from the AC system in this way may reduce a burden on a vehicle operator for refilling the water storage tank. Further, water may be collected opportunistically when an air conditioning compressor is operated (e.g., AC has been requested by a vehicle operator), thereby further providing that the water storage tank level is maintained at sufficient levels for operating the water injection system of the vehicle. The technical effect of adjusting the amount of friction brake effort and the AC compressor load during a braking event is to provide energy to operate the AC compressor without additional fuel injection at the engine and provide a desired amount of brake effort. Additionally, the technical effect of adjusting the AC compressor load based on the water level of the water storage tank is to provide water for water injection into the engine.

As one embodiment, a method includes adjusting an AC compressor load of a mechanical AC system and an amount of friction brake effort to deliver a driver demanded braking effort during a braking event based on a level of water in a water reservoir coupled to a water injection system. In a first example of the method, the method further includes wherein adjusting the AC compressor load and amount of friction brake effort includes increasing a ratio of AC compressor load to friction brake effort as the level of water decreases. A second example of the method optionally includes the first example and further includes wherein adjusting the AC compressor load includes running an AC compressor of the mechanical AC system, the AC compressor mechanically coupled to a crankshaft of an engine of the vehicle. A third example of the method optionally includes one or more of the first and second examples, and further comprises collecting water produced by the mechanical AC system during running the AC compressor and storing the collected water at the water reservoir. A fourth example of the method optionally includes one or more of the first through third examples, and further comprises injecting the water stored at the water reservoir into one or more of an intake manifold, an intake runner of an engine cylinder, and an engine cylinder via one or more water injectors of the water injection system based on engine operating conditions. A fifth example of the method optionally includes the first through fourth examples, and further comprises determining the AC compressor load during the braking event based on the level of water in the water reservoir. A sixth example of the method optionally includes the first through fifth examples, and further includes wherein the driver demanded braking effort is based on a position of a brake pedal and further comprising determining the amount of friction brake effort to apply during the braking event based on a difference between the driver demanded braking effort and the AC compressor load. A seventh example of the method optionally includes the first through sixth examples, and further includes wherein adjusting the AC compressor load and amount of friction brake effort includes decreasing the friction brake effort and increasing the AC compressor load in response to the level of water being below a threshold water level, and wherein the amount of decreasing is based on the amount the level of water is below the threshold water level. An eighth example of the method optionally includes the first through seventh examples, and further includes wherein increasing the AC compressor load in response to the level of water being below the threshold water level includes increasing the AC compressor load even if AC is not requested by a driver at a cabin of the vehicle or a demanded cabin temperature is greater than a current cabin temperature. A ninth example of the method optionally includes the first through eighth examples, and further comprises, in response to AC not being requested by the driver or the demanded cabin temperature being greater than the current cabin temperature during the braking event and increasing the AC compressor load, increasing blending of warmer air into the cabin. A tenth example of the method optionally includes the first through ninth examples, and further comprises increasing the AC compressor load and running the AC compressor of the mechanical AC system when there is not a braking event and AC at a cabin of the vehicle in not requested, in response to the level of water being below a threshold water level, a water injection demand of the water injection system being greater than a threshold injection demand, and a determined fuel economy penalty of running the AC compressor is less than a determined fuel economy penalty of not injecting the water injection demand. An eleventh example of the method optionally includes the first through tenth examples, and further includes wherein the mechanical AC system is a variable displacement AC system and wherein adjusting the AC compressor load includes adjusting the effort and power of an AC compressor based on the driver demanded braking effort.

As another embodiment, a method comprises during a first braking event, not running an AC compressor of a mechanical AC system and decreasing a ratio of AC compressor load to friction brake effort in response to a water level of a water reservoir of a water injection system being above a threshold water level; and during a second braking event, increasing the ratio of AC compressor load to friction brake effort in response to the water level being below the threshold water level. In a first example of the method, the method further comprises decreasing the ratio of AC compressor load to friction brake effort during the first braking event includes increasing the friction brake effort to deliver a driver demanded braking effort, where the amount of increasing the friction brake effort is based on the driver demanded braking effort. A second example of the method optionally includes the first example and further includes wherein both the first braking event and the second braking event include when there is not a request for AC from a driver of the vehicle. A third example of the method optionally includes one or more of the first and second examples, and further includes wherein increasing the ratio of AC compressor load to friction brake effort during the second braking event includes increasing the AC compressor load by a first amount and decreasing the friction brake effort by a second amount, where the first amount is based on the water level and the second amount is based on a difference between a driver demanded braking effort and the first amount. A fourth example of the method optionally includes the first through third examples, and further comprises, during a third braking event where AC is requested by a driver at a cabin of the vehicle, running the AC compressor based on the driver request only and not based on the water level and increasing the friction brake effort to deliver a driver demanded braking effort in response to the water level being above the threshold water level.

As yet another embodiment, a system includes a mechanical air conditioning (AC) system including an AC compressor coupled to and driven by a crankshaft of an engine of the vehicle; friction brakes coupled to wheels of the vehicle; a water injection system including a water reservoir fluidly coupled to the AC system and one or more water injectors coupled to the engine; and a controller including non-transitory memory with computer-readable instructions for: running the AC compressor during a braking event and adjusting a ratio of AC compressor load of the AC compressor to friction brake effort of the friction brakes based on a level of water in the water reservoir. In a first example of the system, the system further includes wherein the water reservoir is fluidly coupled to a condenser of the mechanical AC system, the AC compressor is mechanically coupled to the crankshaft via a pulley, and the one or more water injectors are coupled to each of the water reservoir and an intake system of the engine. A second example of the system optionally includes the first example and further includes wherein the computer-readable instructions further include instructions for: injecting water from the water reservoir via the one or more water injectors in response to a water injection request and further adjusting the AC compressor load during the braking event based on a water injection amount requested by the water injection request.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
adjusting an AC compressor load of a mechanical AC system and an amount of friction brake effort to deliver a driver demanded braking effort during a braking event based on a level of water in a water reservoir coupled to a water injection system.

2. The method of claim 1, wherein adjusting the AC compressor load and amount of friction brake effort includes increasing a ratio of AC compressor load to friction brake effort as the level of water decreases.

3. The method of claim 1, wherein adjusting the AC compressor load includes running an AC compressor of the mechanical AC system, the AC compressor mechanically coupled to a crankshaft of an engine of the vehicle.

4. The method of claim 3, further comprising collecting water produced by the mechanical AC system during running the AC compressor and storing the collected water at the water reservoir.

5. The method of claim 4, further comprising injecting the water stored at the water reservoir into one or more of an intake manifold, an intake runner of an engine cylinder, and an engine cylinder via one or more water injectors of the water injection system based on engine operating conditions.

6. The method of claim 1, further comprising determining the AC compressor load during the braking event based on the level of water in the water reservoir.

7. The method of claim 6, wherein the driver demanded braking effort is based on a position of a brake pedal and further comprising determining the amount of friction brake effort to apply during the braking event based on a difference between the driver demanded braking effort and the AC compressor load.

8. The method of claim 1, wherein adjusting the AC compressor load and amount of friction brake effort includes decreasing the friction brake effort and increasing the AC compressor load in response to the level of water being below a threshold water level, and wherein the amount of decreasing is based on the amount the level of water is below the threshold water level.

9. The method of claim 8, wherein increasing the AC compressor load in response to the level of water being below the threshold water level includes increasing the AC compressor load even if AC is not requested by a driver at a cabin of the vehicle or a demanded cabin temperature is greater than a current cabin temperature.

10. The method of claim 9, further comprising, in response to AC not being requested by the driver or the demanded cabin temperature being greater than the current cabin temperature during the braking event and increasing the AC compressor load, increasing blending of warmer air into the cabin.

11. The method of claim 1, further comprising, increasing the AC compressor load and running the AC compressor of the mechanical AC system when there is not a braking event and AC at a cabin of the vehicle in not requested, in response to the level of water being below a threshold water level, a water injection demand of the water injection system being greater than a threshold injection demand, and a determined fuel economy penalty of running the AC compressor is less than a determined fuel economy penalty of not injecting the water injection demand.

12. The method of claim 1, wherein adjusting the AC compressor load includes adjusting the force and power of an AC compressor based on the driver demanded braking force.

13. A method for a vehicle, comprising:
during a first braking event, not running an AC compressor of a mechanical AC system and decreasing a ratio of AC compressor load to friction brake effort in response to a water level of a water reservoir of a water injection system being above a threshold water level; and
during a second braking event, increasing the ratio of AC compressor load to friction brake effort in response to the water level being below the threshold water level.

14. The method of claim 13, wherein decreasing the ratio of AC compressor load to friction brake effort during the first braking event includes increasing the friction brake effort to deliver a driver demanded braking force, where the amount of increasing the friction brake effort is based on the driver demanded braking effort.

15. The method of claim 13, wherein both the first braking event and the second braking event include when there is not a request for AC from a driver of the vehicle.

16. The method of claim 13, wherein increasing the ratio of AC compressor load to friction brake effort during the second braking event includes increasing the AC compressor load by a first amount and decreasing the friction brake effort by a second amount, where the first amount is based on the water level and the second amount is based on a difference between a driver demanded braking effort and the first amount.

17. The method of claim 13, further comprising, during a third braking event where AC is requested by a driver at a cabin of the vehicle, running the AC compressor based on the driver request only and not based on the water level and increasing the friction brake effort to deliver a driver demanded braking effort in response to the water level being above the threshold water level.

18. A system for a vehicle, comprising:
a mechanical air conditioning (AC) system including an AC compressor coupled to and driven by a crankshaft of an engine of the vehicle;
friction brakes coupled to wheels of the vehicle;
a water injection system including a water reservoir fluidly coupled to the AC system and one or more water injectors coupled to the engine; and
a controller including non-transitory memory with computer-readable instructions for:
running the AC compressor during a braking event and adjusting a ratio of AC compressor load of the AC compressor to friction brake effort of the friction brakes based on a level of water in the water reservoir.

19. The system of claim 18, wherein the water reservoir is fluidly coupled to a condenser of the mechanical AC system, the AC compressor is mechanically coupled to the crankshaft via a pulley, and the one or more water injectors are coupled to each of the water reservoir and an intake system of the engine.

20. The system of claim 18, wherein the computer-readable instructions further include instructions for: injecting water from the water reservoir via the one or more water injectors in response to a water injection request and further adjusting the AC compressor load during the braking event based on a water injection amount requested by the water injection request.

* * * * *